US008148292B2

(12) United States Patent
Soled et al.

(10) Patent No.: US 8,148,292 B2
(45) Date of Patent: Apr. 3, 2012

(54) PREPARATION OF HIGH ACTIVITY COBALT CATALYSTS, THE CATALYSTS AND THEIR USE

(75) Inventors: Stuart L. Soled, Pittstown, NJ (US); Joseph E. Baumgartner, Califon, NJ (US); Christine E. Kliewer, Clinton, NJ (US); El-Mekki El-Malki, Falls Church, VA (US); Patricia A. Bielenberg, Easton, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 12/460,722

(22) Filed: Jul. 23, 2009

(65) Prior Publication Data

US 2010/0022670 A1  Jan. 28, 2010

Related U.S. Application Data

(60) Provisional application No. 61/135,957, filed on Jul. 25, 2008.

(51) Int. Cl.
*B01J 23/00* (2006.01)
*B01J 21/00* (2006.01)

(52) U.S. Cl. ........ 502/325; 502/260; 502/326; 502/350; 502/439

(58) Field of Classification Search .................. 502/260, 502/325, 326, 350, 439
See application file for complete search history.

(56) References Cited

U.S. PATENT DOCUMENTS

| 4,385,193 A * | 5/1983 | Bijwaard et al. ............ 585/310 |
| 4,499,209 A * | 2/1985 | Hoek et al. .................. 518/707 |
| 4,568,663 A | 2/1986 | Mauldin |
| 4,595,703 A * | 6/1986 | Payne et al. ................. 518/715 |
| 4,670,414 A * | 6/1987 | Kobylinski et al. ........... 502/174 |
| 4,701,434 A * | 10/1987 | Koll .............................. 502/230 |
| 4,729,981 A * | 3/1988 | Kobylinski et al. ........... 502/259 |
| 4,738,948 A * | 4/1988 | Iglesia et al. ................. 518/715 |
| 4,801,573 A | 1/1989 | Eri et al. |
| 4,857,559 A | 8/1989 | Eri et al. |
| 5,036,032 A * | 7/1991 | Iglesia et al. ................. 502/260 |
| 5,348,982 A | 9/1994 | Herbolzheimer et al. |
| 5,728,918 A * | 3/1998 | Nay et al. ..................... 585/733 |
| 5,939,350 A * | 8/1999 | Singleton et al. ............ 502/230 |
| 6,100,304 A * | 8/2000 | Singleton et al. ............ 518/715 |
| 6,117,814 A * | 9/2000 | Plecha et al. ................ 502/325 |
| 6,124,367 A | 9/2000 | Plecha et al. |
| 6,537,945 B2 * | 3/2003 | Singleton et al. ............ 502/327 |

(Continued)

FOREIGN PATENT DOCUMENTS

EP  0 450 861 B1  10/1991

(Continued)

OTHER PUBLICATIONS

Tapan K. Das, et al., "Fischer-Tropsch synthesis: characterization and catalytic properties of rhenium promoted cobalt alumina catalysts", *Fuel* 82 (2003) pp. 805-815.

(Continued)

*Primary Examiner* — Cam N. Nguyen

(57) ABSTRACT

A method is provided for preparing a supported cobalt-containing catalyst having substantially homogenously dispersed, small cobalt crystallites. The method comprises depositing cobalt nitrate on a support and then heating the support in an oxygen-containing, substantially water-free atmosphere to about 160° C. to form an intermediate decomposition product. This intermediate decomposition product is then calcined and reduced.

13 Claims, 11 Drawing Sheets

U.S. PATENT DOCUMENTS

| 7,056,857 | B2* | 6/2006 | Srinivasan et al. | 502/327 |
|---|---|---|---|---|
| 7,511,080 | B2* | 3/2009 | Green et al. | 518/715 |
| 7,585,812 | B2* | 9/2009 | Hu et al. | 502/327 |
| 7,732,500 | B2* | 6/2010 | Lok et al. | 518/715 |
| 2004/0242941 | A1* | 12/2004 | Green et al. | 568/910 |

FOREIGN PATENT DOCUMENTS

| WO | PCT/WO98/47618 | 10/1996 |
|---|---|---|
| WO | PCT/WO98/47619 | 10/1998 |
| WO | PCT/WO02/09871 A2 | 2/2002 |
| WO | PCT/WO2004/045767 A2 | 6/2004 |
| WO | PCT/WO2007/071899 A1 | 6/2007 |

OTHER PUBLICATIONS

Enrique Iglesia, et al., "Fischer-Tropsch Synthesis on Cobalt and Ruthenium. Metal Dispersion and Support Effects on Reaction Rate and Selectivity", *Journal of Catalysis* 137 (1992), pp. 212-224.

Stuart L. Soled, et al., "Supported Metal Catalysists: Some Interesting New Leads in an Old Field", *Scientific Bases for the Preparation of Heterogeneous Catalysts*, 2006, pp. 103-110.

J. P. Den Breejen, et al., "On the Origin of the Cobalt Particle Size Effects in Fischer-Tropsch Catalysis", *Journal of American Society*, 2009, 131, pp. 7197-7203.

B. Tsyntsarski, V, et al., "FT-IR study of the nature and reactivity of surface NOx compounds formed after NO adsorption and $NO+O_2$ 2 coadsorption on zirconia- and sulfated zirconia-supported cobalt", Journal of Molecular Catalysis, 2003, 193, No. 1, pp. 139-149.

C. Ehrhardt, et al., "Thermal decomposition of cobalt nitrato compounds: Preparation of anhydrous cobalt(II)nitrate and its characterization by Infrared and Raman spectra", *Thermochimica Acta*, 2005, 432, No. 1, pp. 36-40.

M. Kantcheva, et al., "Cobalt supported on zirconia and sulfated zirconia I. FT-IR spectroscopic characterization of the $NO_x$ species formed upon NO adsorption and $NO/O_2$ coadsorption", *Journal of Catalysis*, 223 (2004) 352-363.

K. Hadjiivanov, et al., "Stability and reactivity of the nitrogen-oxo species formed after NO adsorption and $NO+O_2$ coadsorption on Co-ZSM-5: an FTIR spectroscopic study", *Phys. Chem. Chem. Phys.*, 1998, 1 4521-4528.

B. Djonev, et al., "IR spectroscopic study of $NO_x$ adsorption and $NO_x$ -$O_2$ coadsorption on $Co^{2+}/SiO_2$ catalysts", *J. Chem. Soc., Faraday Trans.*, 1997, 93(22), 4055-4063.

A. Satsuma, et al., "FTIR Studies of the Origin of Deactivation during the Decomposition of Nitromethane on Co-ZSM5", *Journal of Catalysis*, 181 (1999), 165-169.

L. J. Lobree, et al., "NO Reduction by CH4 in the Presence of O2 over Pd-H-ZSM-5", *Journal of Catalysis* 181, 189-204 (1999).

K. Hadjiivanov, et al., "FT-IR study of NO+O2 co-adsorption on H-ZSM-5: re-assignment of the 2133 $cm^{-1}$ band to $NO^+$ species", *Catalysis Letters* 52 (1998) 103-108.

* cited by examiner

PREPARATION OF HIGH ACTIVITY COBALT CATALYSTS, THE CATALYSTS AND THEIR USE

This application claims the benefit of U.S. Provisional Application No. 61/135,957 filed Jul. 25, 2008.

FIELD OF THE INVENTION

The invention relates broadly to supported, cobalt-containing catalysts. More particularly, the invention relates to cobalt-containing catalysts of highly dispersed, small particle size cobalt crystallites.

BACKGROUND OF THE INVENTION

An object of the present invention is to provide an improved method for preparing a catalyst having highly-dispersed, small particle size cobalt.

Catalysts comprising cobalt on a support such as silica or alumina are known to be useful in hydrogenation reactions such as hydrogenating aldehydes and nitriles. They are also used in hydrocarbon synthesis via the Fischer-Tropsch process.

In the case of the Fischer-Tropsch hydrocarbon synthesis process, especially when conducted in a slurry bubble column reactor, the preferred catalyst comprises cobalt supported on a titania support. Generally, the titania in such catalysts is in its rutile form.

Promoter metals, such as rhenium, zirconium, manganese and Group VIII noble metals, are commonly used with cobalt catalysts to improve various aspects of catalytic performance. For example, the presence of Re or a Group VIII metal has a beneficial effect on the dispersion of Co crystallites.

The activity of a cobalt-containing Fischer-Tropsch catalyst has been shown to be proportional to the surface cobalt sites for cobalt particle sizes above 6 nm (cf., *Journal of Catalysis*, (1992), 137(1), 212-224). It also has been shown that metal crystallites that have poor nanoscale homogeneity tend to agglomerate to a more severe degree than those with homogeneous nanoscale distribution (cf., *Stud. Surf. Sci. and Catalysis*, Vol. 162, (2006), pg 103-110). Purportedly, the optimum cobalt crystallite size for Fischer-Tropsch catalysis is in the range of 6 nm since this provides a larger number of surface cobalt sites than larger crystallites and since crystallites below 6 nm have lower site activity than those of 6 nm and larger cf., den Breejen, et al., "On the Origin of the Cobalt Particle Size Effects in Fischer-Tropsch Catalysis", *Journal of American Chemical Society*, (2009), 131(20), 7197-7203).

Thus, an objective of the present invention is to prepare cobalt-containing catalysts that have an appropriate cobalt crystallite size and good nanoscale homogeneity.

Patent Publication WO 2007/071899 A1 discloses that exposing silica-supported cobalt nitrate to a gas mixture containing NO and less than 5 vol % $O_2$ in He at the nitrate decomposition temperature and then followed by reduction results in the formation of very small metal particles.

Another objective of the present invention is to provide a method for forming a cobalt catalyst having small cobalt crystallite size with good nanoscale distribution without the use of NO and He or NO with any inert or oxidizing gas.

In U.S. Pat. No. 4,568,663, there is disclosed a Fischer-Tropsch hydrocarbon synthesis process which utilizes a catalyst comprising cobalt, rhenium and titania. This catalyst is made by impregnating a titania support with an aqueous solution of cobalt nitrate and perrhenic acid by the conventional incipient wetness method, drying and then calcining to decompose the cobalt nitrate to the oxide. The presence of rhenium serves several important functions: one is to aid in the dispersal of the cobalt oxide; another is to aid in the reduction of the cobalt oxide when the catalyst is activated. High dispersion and full reduction of the cobalt results in a highly active catalyst.

SUMMARY OF THE INVENTION

In a first aspect, the present invention comprises a method for preparing a supported cobalt catalyst, preferably a titania—or silica—supported cobalt catalyst having highly-dispersed, small particle size cobalt, with a homogeneous nanoscale cobalt distribution, and which contains 0.2 wt % or less of rhenium.

In a second aspect, the invention comprises a method for preparing a metal or metal oxide promoted, supported cobalt-containing catalyst having highly-dispersed, small particle size cobalt, with a homogeneous nanoscale cobalt distribution.

Other aspects of the invention will become apparent from the detailed description that follows.

In each of the various aspects of the invention, the catalyst is prepared by depositing cobalt nitrate on a catalyst support. Optionally, a promoter metal solution may also be deposited on the support. If used, the promoter metal may be co-deposited with the cobalt nitrate or subsequent to the cobalt deposition. The so treated support is then dried. After drying, the support is heated in an oxygen-containing, substantially water-free atmosphere to about 160° C. to partially decompose the cobalt nitrate, thereby forming an intermediate decomposition product. The intermediate product is next calcined in air and then reduced.

Catalysts prepared by the foregoing method have highly dispersed cobalt with a surface-volume-averaged diameter of about 11 nm and less.

Another aspect of the invention is the use of the catalyst in the Fischer-Tropsch hydrocarbon synthesis process.

DETAILED DESCRIPTION OF THE INVENTION

Figure 1:
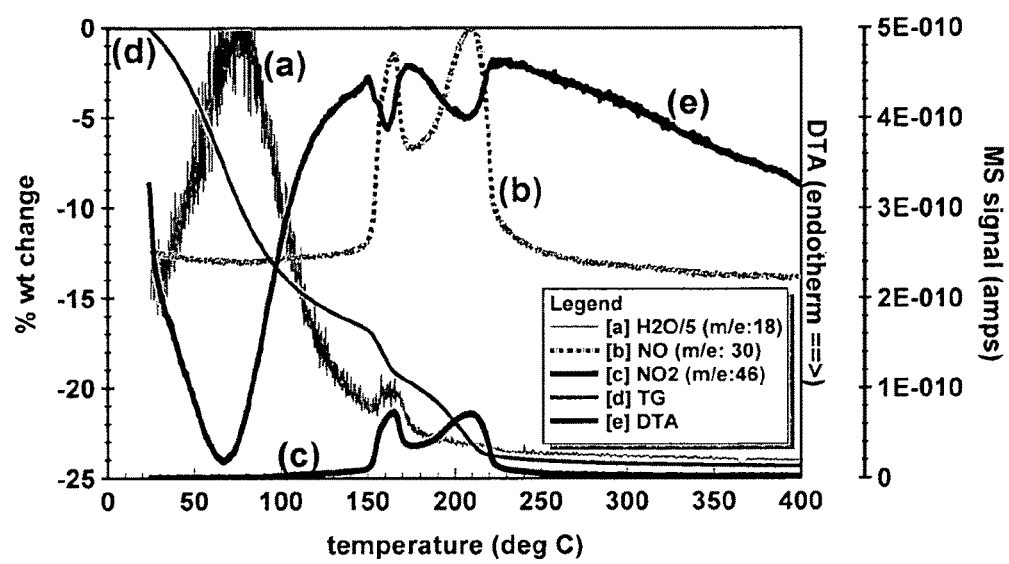
FIG. 1 is a TG/DTA spectra of a cobalt nitrate-perrhenic acid impregnated titania support that was heated in air from room temperature to 400° C. at 1° C./min.

Catalyst supports useful in the method of the present invention include titania, silica, chromia, alumina, magnesia, silica-alumina, zirconia and the like. For use of this catalyst in the Fischer-Tropsch hydrocarbon synthesis process, it is preferred that the support comprise primarily titania where greater than 50 wt % of the titania is in the rutile phase. A particularly preferred support is disclosed in U.S. Pat. No.

6,124,367, which is incorporated by reference herein in its entirety. That support comprises primarily titania, converted from its anatase form to its rutile form, and a minor amount of a binder comprising alumina and/or silica.

Typically, the support used will have a surface area in the range of about 5 $m^2/g$ to about 40 $m^2/g$ and preferably from 10 $m^2/g$ to 30 $m^2/g$. Pore volumes will range from about 0.2 cc/g to about 0.5 cc/g and preferably from 0.3 cc/g to 0.4 cc/g.

The cobalt is loaded on the catalyst support using techniques well known in the art, such as, impregnation of the support with a solution of cobalt nitrate either by spray drying or by the incipient wetness technique. Typically, the concentration and amount of the cobalt solution will be sufficient to provide a cobalt loading in the finished catalyst in the range of about 6 wt % to about 20 wt % and preferably about 8 wt % to about 12 wt % based on the total weight of the catalyst.

Optionally, a promoter metal solution also may be deposited on the support. Useful promoter metals include metals of Group IV, VII and the Group VIII noble metals. These may be co-deposited with the cobalt nitrate or subsequent to the cobalt deposition. In general, the promoter metal solution will be sufficient to provide a metal loading in the final catalyst in the range of about 0.1 wt % to about 5 wt %.

In an alternate and preferred embodiment, the support is treated with sufficient perrhenic acid to provide a loading of rhenium on the catalyst in the range of about 0.2 wt % to about 1.2 wt % and preferably in an amount greater than about 0.5 wt % to about 1.0 wt %, based on the total weight of the catalyst composition.

After impregnating the support with sufficient cobalt nitrate, and optionally a promoter metal solution, if a promoter metal is to be present, the impregnated support is dried in air by heating the support above ambient temperature up to about 120° C. for a time sufficient to remove water from the support. For example, the impregnated support may be heated in a rotary calciner up to about 120° C., conveniently for a period of from 30 minutes to one or several hours.

Importantly, the dried cobalt nitrate-containing support is subjected to a two-step decomposition protocol. In the first step, the dried cobalt nitrate-containing support is heated to a temperature sufficient for the catalyst to pass through the first endotherm of the nitrate decomposition as measured by thermal gravimetric/differential thermal analysis (TG/DTA) but not the second endotherm. Typically cobalt nitrate-containing support will be heated to 160° C.±5° C. in an oxygen-containing atmosphere that is substantially free of water and is free of added NO. One skilled in the art can readily determine when the cobalt nitrate-containing support has passed through the first endotherm as readily seen in FIG. 1. For example, the atmosphere preferably will contain less than 1% water and more preferably down to about 0% water. A particularly preferred atmosphere is dry air. Following the first decomposition the cobalt nitrate-containing support is referred to as an intermediate material. The second step in the decomposition protocol is a calcination step. Further evidence of the formation of the intermediate material following the first decomposition is provided by the appearance of infrared peaks in the range of 1820-1877 $cm^{-1}$ which are indications of the formation of nitrosyl species. Hence, the intermediate material formed by the first decomposition is a cobalt nitrosyl species evidenced by peaks in the range of 1820-1877 $cm^{-1}$ in an infrared scan. The nitrosyl species is only present following the first decomposition, not before it and not after calcination.

The significance of the two-step protocol, with the first being conducted in a substantially dry atmosphere, is illustrated by reference to FIGS. 1 to 3.

First, FIG. 1 is a thermal gravimetric/differential thermal analysis (TG/DTA) spectra of a dried cobalt nitrate-perrhenic acid impregnated titania support that was heated in air at 1° C./min. from room temperature to 400° C. It is clearly seen that the nitrate decomposition follows a discrete two-step pattern with two endothermic events characterizing the process. Thus, FIG. 1 shows water loss from the support at temperatures below about 121° C. followed by the evolution of $NO_x$ and $H_2O$ at about 160° C. followed by only $NO_x$ being evolved at about 210° C.

Figure 2:
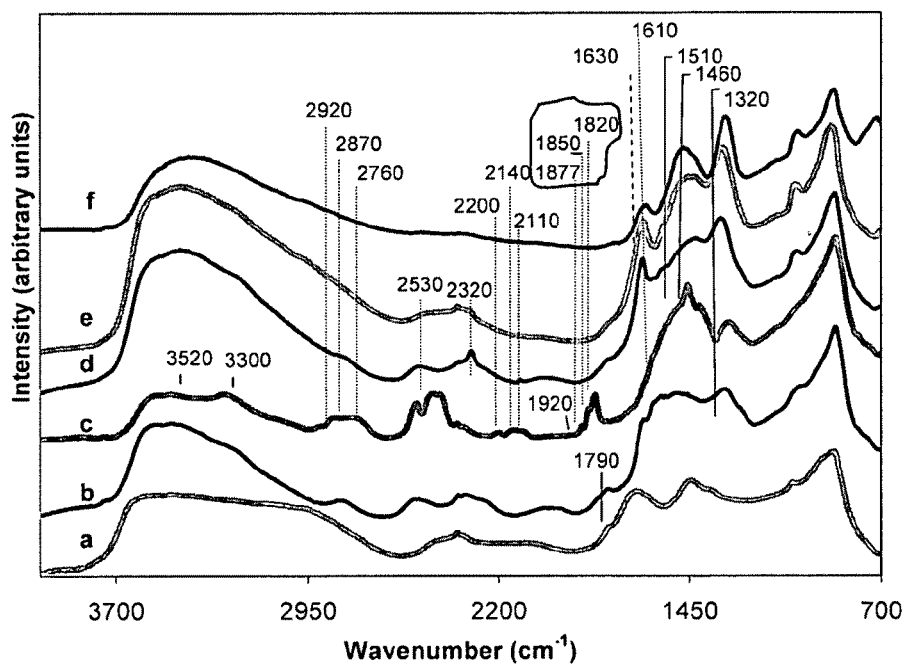
FIG. 2 is a DRIFT spectra of a cobalt nitrate-perrhenic acid impregnated titania support that was subjected to various treatments.

FIG. 2 is diffused reflectance infrared Fourier transform spectroscopy (DRIFTS) spectra for: (a) the fresh Co—Re impregnated titania-supported catalyst, (b) after drying in 10% $O_2$/He at 121° C. for 60 mins., (c) after calcining in 10% $O_2$/He at 160° C. for 60 mins. (forming the intermediate), (d, e) after exposure to 10% $H_2O$ in He for 5 mins. and 15 mins. at 160° C., and (f) after purge with He for 60 mins. This spectra (c) shows peaks developing at 1820-1877 $cm^{-1}$ (circled in the figure) which are indications of the formation of nitrosyl species after the first decomposition step. This species appears to disperse readily on the support and is hydrolytically unstable. Hence, the need to form this intermediate species in a dry environment.

Figure 3:
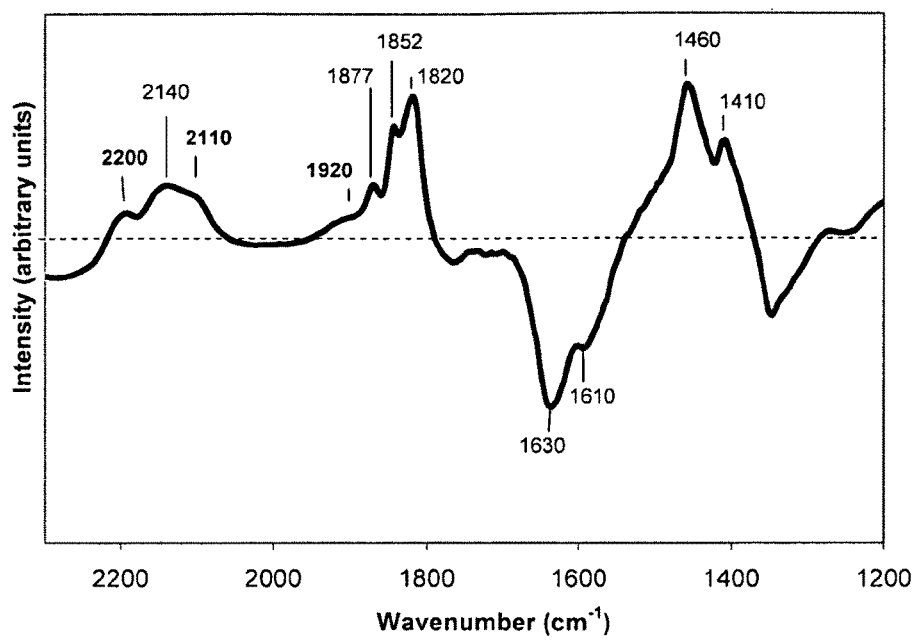
FIG. 3 is a difference DRIFTS spectra obtained by subtracting spectrum (b) of FIG. 2 from spectrum (c) of FIG. 2.

FIG. 3 is a DRIFTS spectrum obtained by subtracting the spectrum (b) of FIG. 2 from the spectrum (c) of FIG. 2. Basically, FIG. 3 illustrates that the dry atmosphere for the first decomposition in the two-step treatment protocol results in the formation of hydrolytically unstable nitrosyl species.

Returning to the treatment protocol of the method of the invention, it is desirable to maintain the heated cobalt nitrate-containing support at the temperature which forms the first endotherm (160° C.)±5° C. for a time sufficient for the intermediate to form and disperse on the support. The residence time of the intermediate will depend to some extent upon the type of heating system employed. For example, if heating is conducted in a regular box furnace, residence times may be an hour or more. On the other hand, if heating is conducted in a rotary calciner, residence times may be much shorter. Thus, in the case of a rotary calciner, the heated cobalt nitrate-containing support may be maintained at about 160° C. for a period of time which may be less than one minute but preferably for at least one minute and more preferably will be from about 2 minutes to about 10 minutes.

After the first decomposition step, the intermediate formed is subject to a second decomposition step in which the intermediate product is calcined. This second decomposition step is then followed by reduction.

Calcination is typically conducted in an oxygen-containing atmosphere, such as flowing air, at temperatures sufficient to pass through the second endotherm of the nitrate decomposition as measured by TG/DTA and form cobalt oxide. Typical temperatures for such calcination are above about 160° C., such as between about 300° C. to about 450° C., for about 1 to about 2 hours.

Reduction typically will be conducted in a flowing $H_2$ atmosphere at temperatures in the range of about 250° C. to about 450° C. for about 1 to 2 hours.

The catalysts prepared by the method of the invention are characterized as having small cobalt particles that are homogeneously distributed on the support surface. Indeed, the surface volume particle size distribution, Dsv, of these catalysts typically is 10 nm or less, i.e., down to about 6 nm.

A cobalt-rhenium, titania-supported catalyst prepared according to the invention is particularly suitable for use in hydrocarbon synthesis via the Fischer-Tropsch synthesis process, for as is known in the art, high dispersion and full reduction of the cobalt results in a more active catalyst.

Importantly, a catalyst of the invention achieves high dispersion, full reduction and good homogenous nanoscale distribution of the cobalt.

Thus, one embodiment of the invention comprises use of the catalyst prepared as disclosed and claimed herein in the Fischer-Tropsch synthesis process. As is described in the available literature, the Fischer-Tropsch process is conducted at temperatures in the range of about 175° C. to about 400° C. at pressures of from about 1 to 100 bar. The $H_2/CO$ ratios range from 0.5/1 to about 4/1. Preferably, the catalyst made according to the invention is used in the process in a slurry bubble column reactor with gas hourly space velocities ranging from about 1,000 to 25,000. A preferred slurry bubble column operation is described in U.S. Pat. No. 5,348,982, incorporated herein by reference.

EXAMPLES

Experimental Measurements

A. Dsv Analysis

The Dsv (surface-volume-averaged diameter) data for the catalysts described herein were obtained by collecting about 20 to 80 random images of a given catalyst with a Philips CM 12 or Philips CM 200 transmission electron microscope operated at 120 kV and 200 kV, and at screen magnifications of 53,000× and 54,000× respectively. In all cases, the data were collected as digital images with a Gatan CCD camera system using Gatan's Digital Micrograph program, v. 2.5. The line drawing tool in the Digital Micrograph program was used to mark the diameter of each imaged metal particle from which a statistically determined Dsv is obtained. To calculate the Dsv, a histogram of the distribution of particle sizes is obtained from the TEM (transmission electron microscope) measurements, and from the histogram the Dsv is obtained by the following equation:

$$Dsv = \{sum(N_i D_i^3)\}/\{sum((N_i D_i^2)\}$$

where $N_i$ is the number of particles with a diameter $D_i$.

B. TG/DTA/MS Analysis

TG/DTA data were collected on a Mettler TA 850 thermal analyzer to which a Balzers mass spectrometer was connected to monitor effluent gases. Samples of the catalysts were heated in a flowing air at rates of 1° C./min.

C. FTIR Measurements

DRIFTS (Diffuse Reflectance Infrared Fourier Transform Spectroscopy) measurements were obtained on a Nicolet 670 FTIR spectrometer equipped with a liquid nitrogen cooled MCT detector.

EXAMPLES

In the Examples and Comparative Examples which follow, a number of cobalt-rhenium catalysts were prepared. All of the catalysts prepared were made using an identical titania support. In all instances, a cobalt nitrate and perrhenic acid solution was sprayed onto the support in a rotary tumbler to ensure a well-mixed, free-flowing impregnate. Thereafter, the impregnated supports were subjected to different thermal treatments, and the resultant catalysts were subjected to transmission electron microscopic (TEM) characterization and Dsv measurements.

1. Preparation of Titania Support (a) The Titania Support

A titania support was prepared by spray-drying as follows. A slurry feed was prepared by mixing 34.4 parts (by weight) of Degussa P-25 fumed $TiO_2$, 8.8 parts alumina chlorhydrol sol (containing 23.5 wt % $Al_2O_3$), 0.6 parts silica sol (Nyacol 2034 DI, containing 35 wt % $SiO_2$), and 56.2 parts water. This mixture was fed to a 9-foot diameter spray-drier at a rate of about 13 lb./minute through a 9-inch wheel atomizer spinning at 10,000 rpm. The spray-drying chamber was operated with an inlet air temperature of about 285° C. and an outlet temperature of about 120° C. while spraying. The product consisted of solid spherical particles with an average size of about 60 microns and a composition of 94% $TiO_2$, 5.4% $Al_2O_3$, 0.6% $SiO_2$ by weight.

The spray-dried support was calcined at 1000° C. to produce a support in which 93 wt % of the titania was in the rutile phase as determined by X-ray diffraction (ASTM D 3720-78). The balance of the titania was in the anatase phase. The support had a surface area of 17 $m^2/g$ and a water pore volume of 0.33 cc/g.

(b) Cobalt and Rhenium Deposition

The catalyst precursors (dry impregnates) were prepared by spraying the titania support with a cobalt nitrate and perrhenic acid solution in a bench scale rotary tumbler and tumbled for ten minutes to ensure a well-mixed, free-flowing impregnate. Two types of samples were prepared: (i) dry impregnates having 6.9% Co and 0.12% Re, hereinafter referred to as "Low Re Impregnates"; (ii) impregnates having 7.0% Co and 0.58% Re, hereinafter referred to as "High Re Impregnates". In the case of the Low Re Impregnates, the support was impregnated with a 15.8 wt % Co and 0.28 wt % Re solution followed by heating in air at 4° C./min to 121° C. to dry the impregnate. In the case of the High Re Impregnates, the support was impregnated with a 14.7 wt % Co and 1.2 wt % Re solution. After each impregnation, the impregnate was dried by heating in air at 4° C./min to 121° C.

2. Comparative Example 1

Figure 4A:
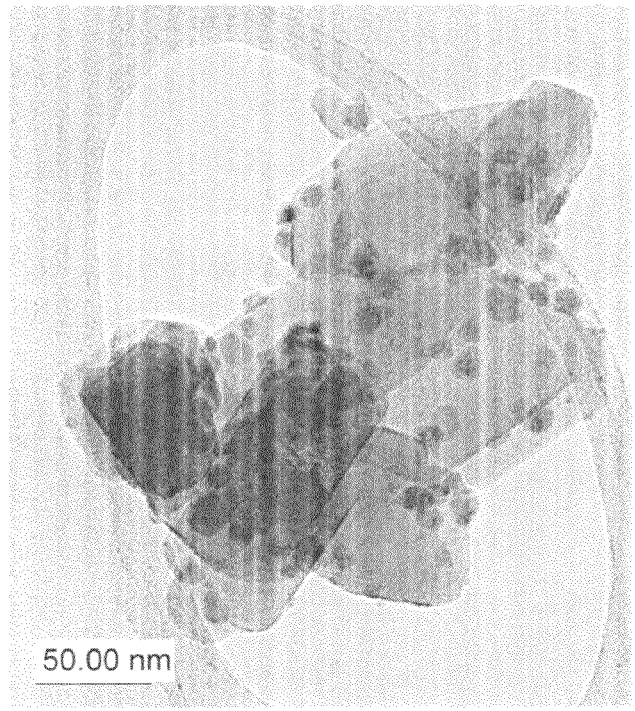
FIGS. 4a, 4b, 4c and 5a are microphotographs of two titania-supported cobalt catalysts that were prepared by methods other than that of the present invention.
Figure 4B:
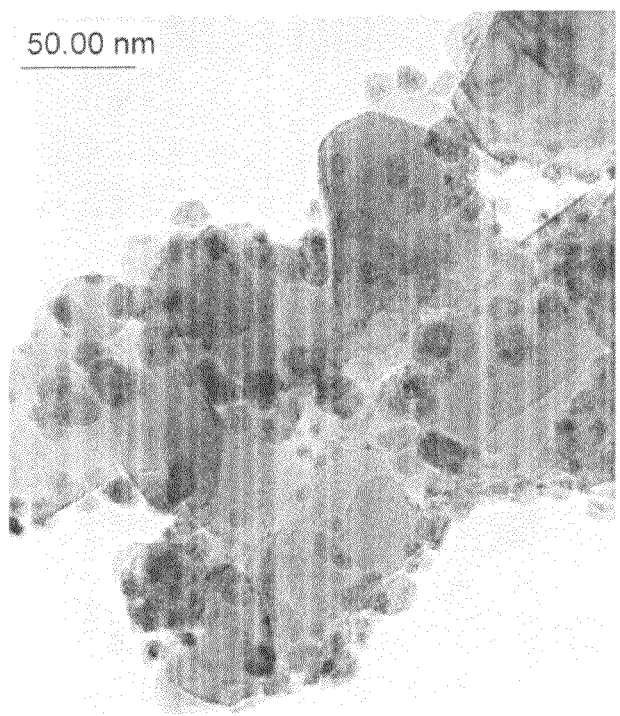
Figure 4C:
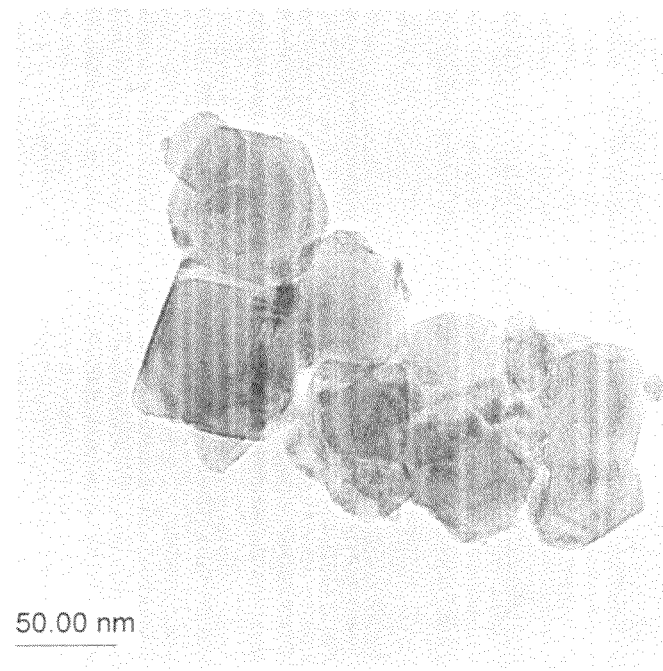

A dried High Re Impregnate was heated in air at 4° C./min. to 300° C. and held at that temperature for 1 hour. The so heated impregnate was then reduced in 100% $H_2$ at 375° C., passivated with 1% $O_2$ and then air dried to allow measurement by TEM. FIGS. 4a, 4b and 4c show poorly distributed Co crystallites, with certain portions of the catalyst having reasonable crystallite distribution (FIG. 4a) and others having a very dense (FIG. 4b) or very sparse (FIG. 4c) distribution.

3. Comparative Example 2

Figure 5A:
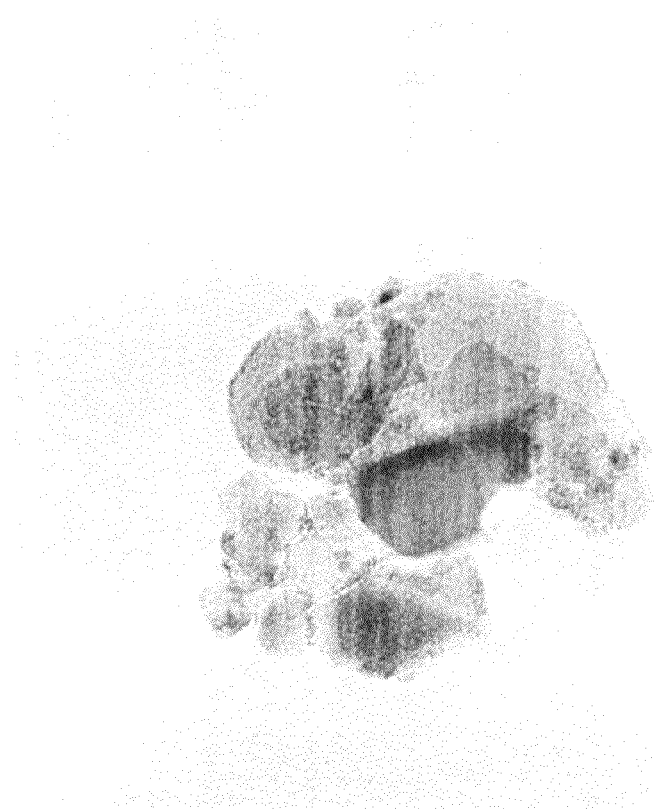
Figure 5B:
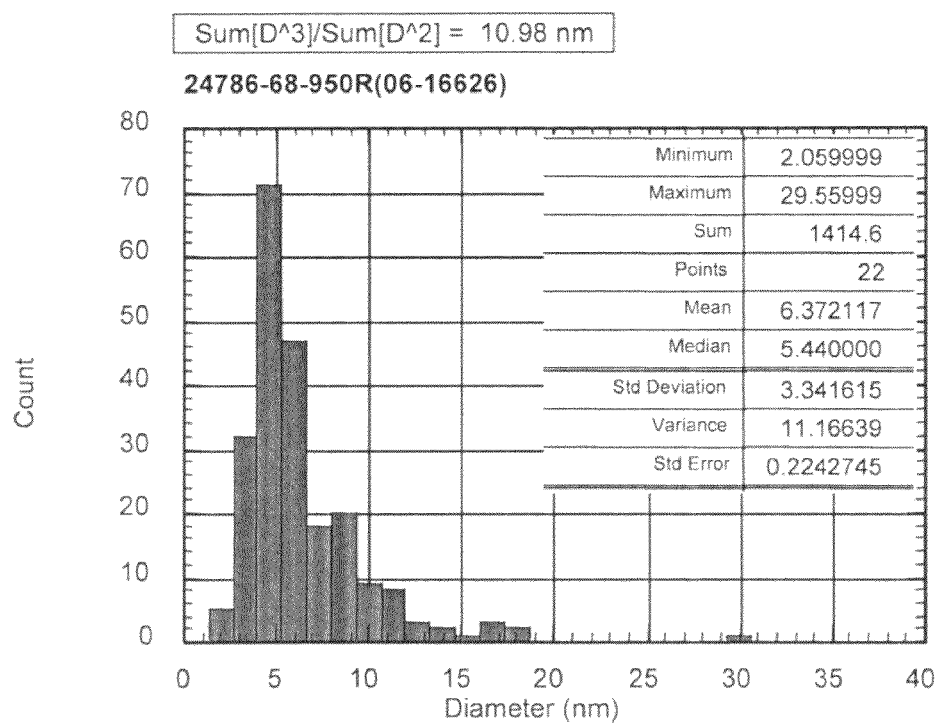
FIG. 5b is a TEM histogram of one of those catalysts.

A dried High Re Impregnate was heated in air at 4° C./min. to 160° C. (to partially decompose the Co nitrate) and held at that temperature for 1 hour. The so heated impregnate was then reduced in 100% $H_2$ at 375° C., passivated and subjected to TEM analysis. The results are shown in FIGS. 5a and 5b. As can be seen, the Co crystallites of the catalyst of this comparative Example 2 are not well distributed and have a Dsv of about 11 nm.

4. Example 1

Figure 6A:
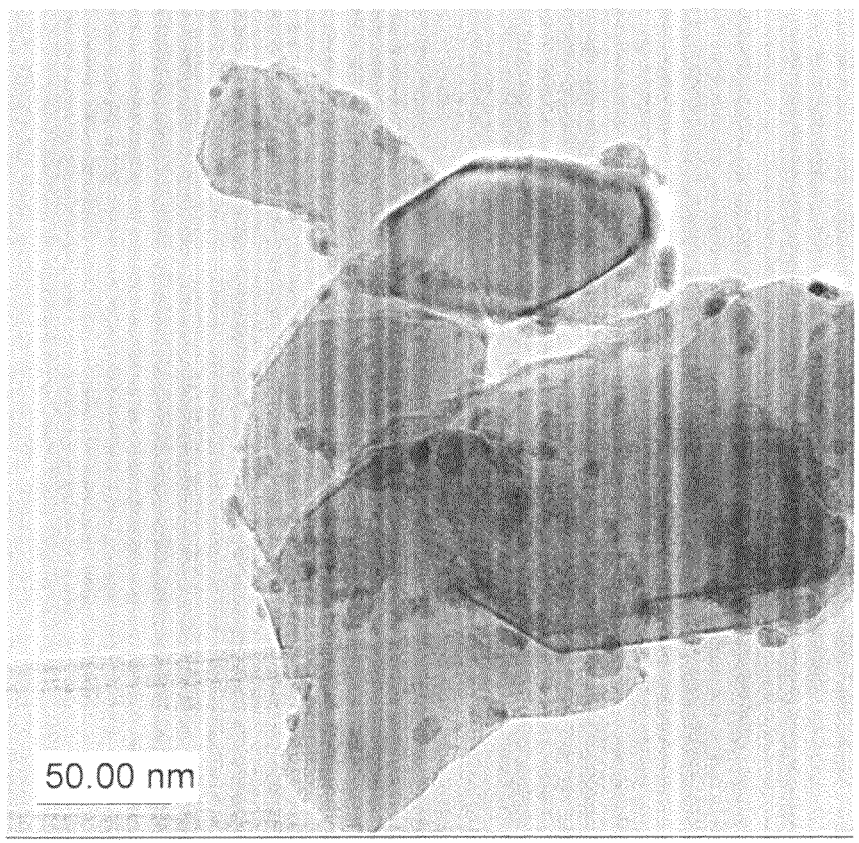
FIGS. 6a and 6b and 6c are microphotographs of titania-supported cobalt catalysts prepared according to the method of the invention.
Figure 6B:
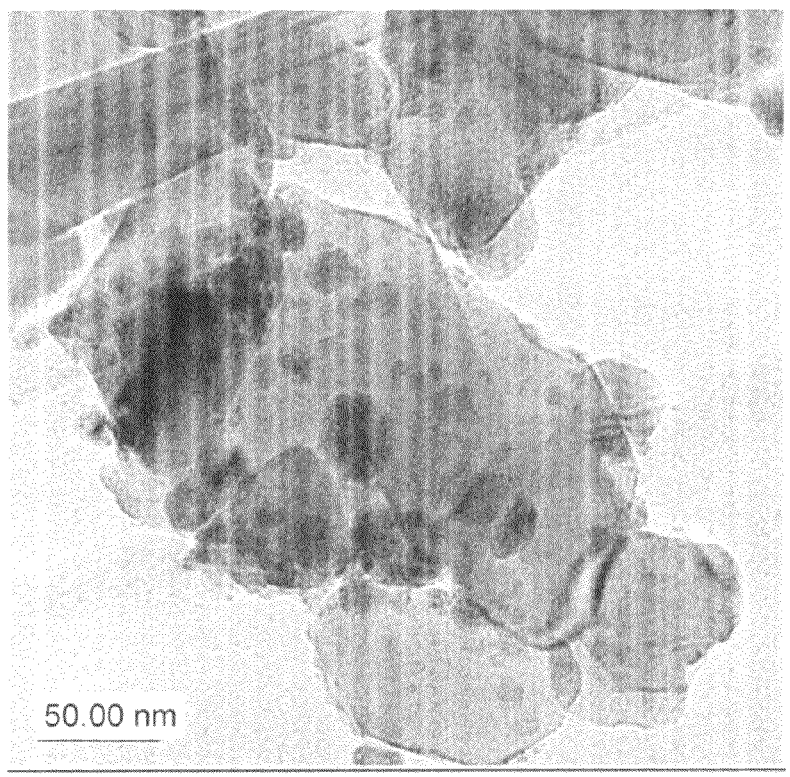
Figure 6C:
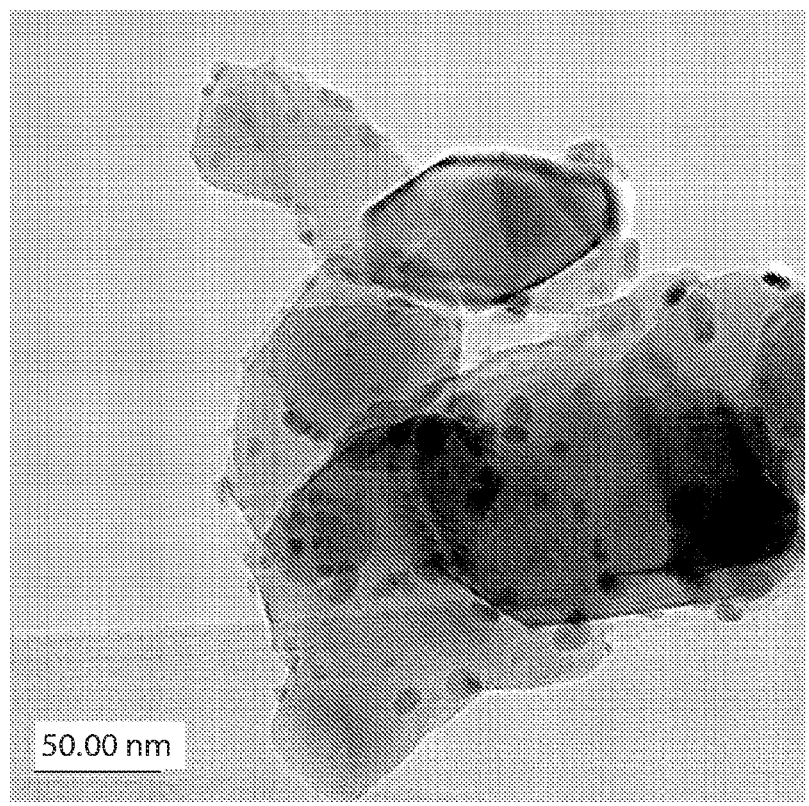
Figure 6D:
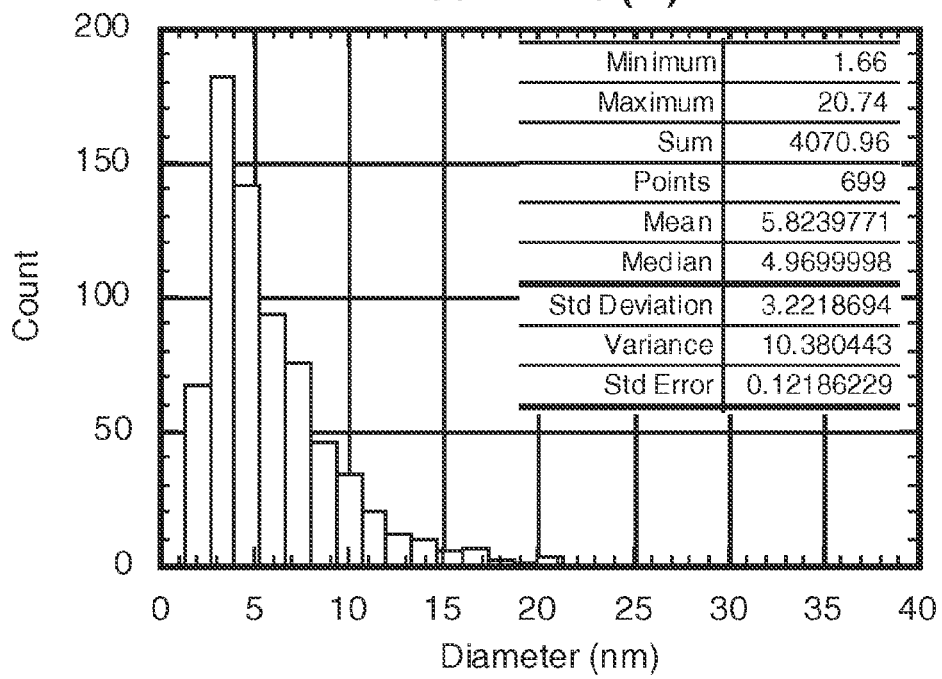
FIGS. 6d and 6e are TEM histograms of the catalyst.

A dried High Re Impregnate was heated in air at 4° C./min. to 160° C. (to partially decompose the Co nitrate) and held at that temperature for 1 hour, followed by heating at 4° C./min. to 300° C. and holding for 1 hour at that temperature (to form cobalt oxide). This calcined material was reduced in 100% $H_2$ at 375° C. at atmospheric pressure for 90 minutes. After cooling to room temperature, the catalyst was passivated in 1% $O_2$ and then air dried to allow measurement by TEM. This treatment formed well distributed Co crystallites of about 10 nm. FIG. 6a shows Co crystallites of about 10 nm. FIG. 6d is the TEM histogram of the analyzed material of Example 1.

5. Example 2

Figure 6E:
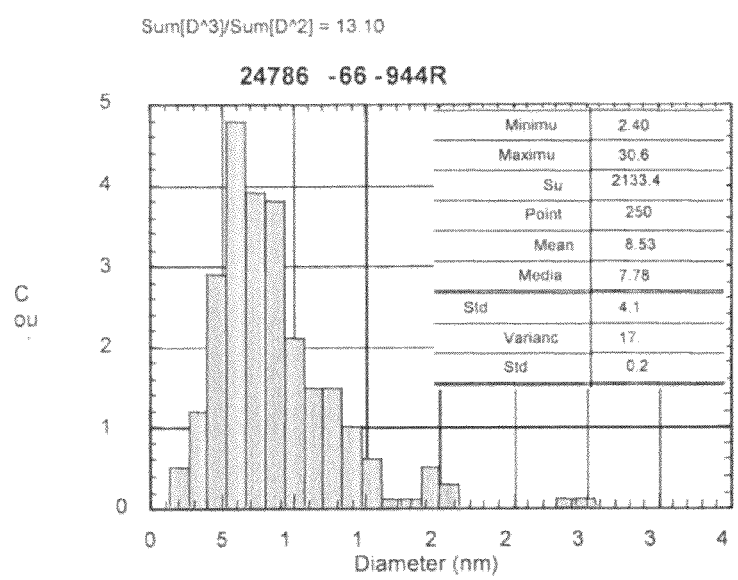

A dried Low Re Impregnate was heated in air at 4° C./min. to 160° C. (to partially decompose the Co Nitrate) and held at that temperature for 1 hour, followed by heating at 4° C./min. to 300° C. and holding for 1 hour at that temperature (to form cobalt oxide). This calcined material was reduced in 100% $H_2$ at 375° C. at atmospheric pressure for 90 minutes. After cooling to room temperature, the catalyst was passivated in 1% $O_2$ and then air dried to allow measurement by TEM. FIGS. 6b and 6c show Co crystallites of about 13 nm. FIG. 6e is the TEM histogram of the analyzed material of Example 2.

What is claimed is:

1. A method for preparing a cobalt-containing catalyst, the method comprising:
    a. impregnating a catalyst support with an aqueous solution of cobalt nitrate;
    b. drying the cobalt-impregnated support;
    then subjecting the dried cobalt-impregnated support to a two step decomposition process comprising:
    c. heating the dried support in an oxygen-containing atmosphere that is substantially free of water and is free of added NO, said heating being at a temperature and for a time sufficient to show infrared peaks developing at 1820 $cm^{-1}$ to 1877 $cm^{-1}$ and at a temperature at which only a first endotherm of nitrate decomposition occurs and for a time sufficient for the dried support to pass through only the first endotherm of the nitrate decomposition thereby providing an intermediate material; and
    d. calcining the intermediate material to form cobalt oxide; and
then, reducing the calcined catalyst to obtain a cobalt-containing catalyst.

2. The method of claim 1 wherein the support is a titania support.

3. The method of claim 1 wherein the oxygen-containing atmosphere is dry air.

4. The method of claim 1 wherein the intermediate material is a nitrosyl species.

5. The method of claim 4 wherein the nitrosyl species is present following said heating but not following said calcining.

6. The method of claim 1 wherein the support is heated to and held at about 160° C.±5° C. for a time ranging from less than about 1 minute to greater than about 1 hour.

7. The method of claim 6 wherein the support is heated in a rotary calciner to about 160° C.±5° C. and held at that temperature for about 2 minutes to about 10 minutes.

8. The method of claim 1 wherein calcination takes place at a temperature of about 300° C. to about 450° C. for about 1 to about 2 hours.

9. The method of claim 1 including impregnating the support with a promoter metal selected from the group consisting essentially of Group IV, VII and VIII metals, and mixtures thereof before the impregnated support is heated to partially decompose the cobalt nitrate.

10. The method of claim 9 wherein the promoter metal is used in an amount sufficient to provide a loading of the metal or mixture of metals in the range of about 0.01 wt % to about 5 wt % based on the total weight of the catalyst.

11. The method of claim 10 wherein the promoter metal is rhenium.

12. The method of claim 11 wherein the rhenium is sufficient to provide from about 0.5 wt % to about 1 wt % loading of rhenium on the catalyst, based on the total weight of the catalyst.

13. The method of claim 1 wherein the cobalt containing catalyst has a surface volume particle size distribution, $D_{SV}$, of less than about 10 nm.

* * * * *